United States Patent

[11] 3,570,517

| [72] | Inventor | Hubert Odenthal |
| | | Wombach, Germany |
| [21] | Appl. No. | 841,011 |
| [22] | Filed | July 11, 1969 |
| [45] | Patented | Mar. 16, 1971 |
| [73] | Assignee | G. L. Rexroth GmbH |
| | | Lohr Main, Germany |
| [32] | Priority | July 16, 1968 |
| [33] | | Germany |
| [31] | | P 17 75 203.3 |

[54] APPARATUS FOR REGULATING THE FLOW OF LIQUIDS
10 Claims, 3 Drawing Figs.

[52] U.S. Cl.................................................. 137/87, 91/447
[51] Int. Cl..................................................... F15b 11/08
[50] Field of Search........................................ 137/87, 98, 100; 91/446—448; 60/52 (PJ), 26 (up)

[56] References Cited
UNITED STATES PATENTS
| 2,593,701 | 4/1952 | Sanford.................... | 137/98 |
| 2,981,287 | 4/1961 | Caslow...................... | 91/446 |
| 3,460,440 | 8/1969 | Brent......................... | 91/447 |

Primary Examiner—William F. O'Dea
Assistant Examiner—David J. Zobkiw
Attorney—Michael S. Striker ABSTRACT: Apparatus which controls the flow of pressurized liquid between a pump and a reservoir on the one hand and the chambers of a double-acting cylinder on the other hand comprises a pressure reducing valve whose housing accommodates a reciprocable spool which can throttle the flow of liquid in the second of two channels provided in the housing and connected with opposite chambers of the cylinder. The first channel is in permanent communication with an internal chamber of the housing which accommodates one end surface of the spool and a spring which biases the spool to a position in which the spool offers less resistance to the flow of liquid in the second channel. A four-way valve regulates the flow of liquid between the channels of the housing and the pressure source and reservoir. When the pressure of liquid in the first channel rises, such pressure is communicated to the chamber and causes the liquid acting against the end surface of the spool to assist the action of the spring.

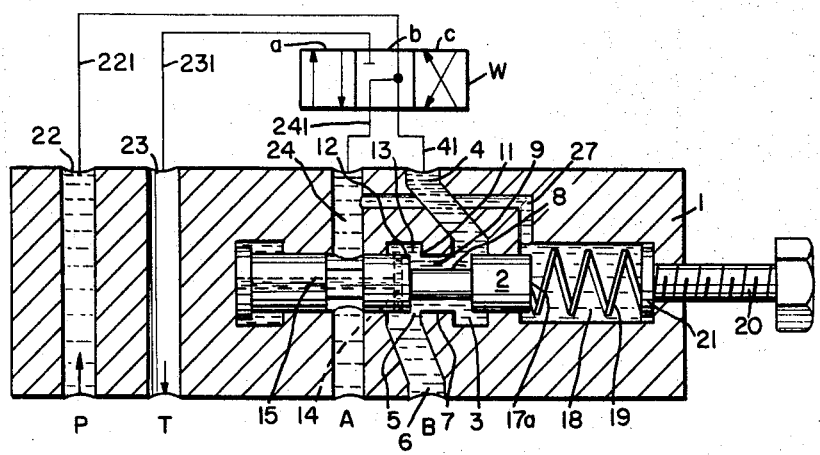
FIG. 1
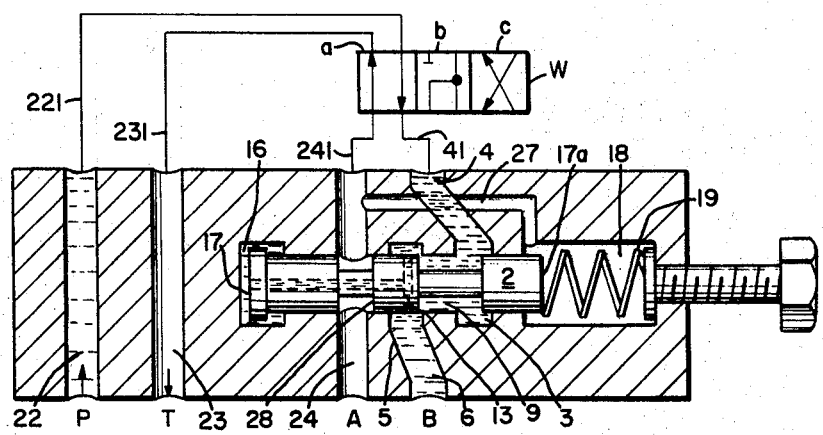
FIG. 2
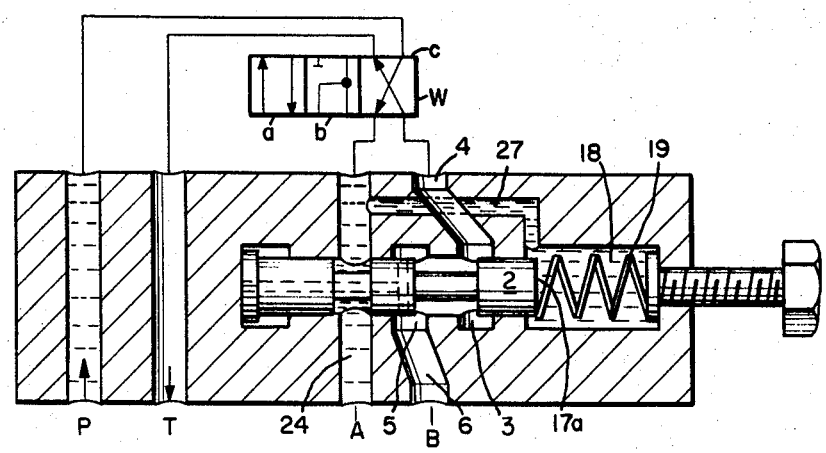
FIG. 3
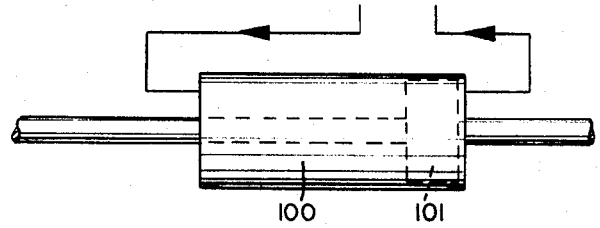
INVENTOR.
HUBERT ODENTHAL

APPARATUS FOR REGULATING THE FLOW OF LIQUIDS

BACKGROUND OF THE INVENTION

The present invention relates to apparatus for regulating the flow of hydraulic fluids to and from hydraulic motors or like consuming machines. More particularly, the invention relates to apparatus which can be utilized for regulation of liquid flow between a source of pressurized liquid and a liquid reservoir on the one hand, and the chambers of a double-acting hydraulic cylinder on the other hand.

It is already known to connect a double-acting hydraulic cylinder with a hydraulic pump or with another source of pressurized liquid by way of a pressure reducing valve which regulates the flow of liquid to one of the cylinder chambers. If the valve is adjustable, the operator can regulate the liquid pressure in the one chamber and hence the force with which the piston of the cylinder moves in one direction.

When the other chamber of the double-acting cylinder receives pressurized liquid, the pressure reducing valve must permit escape of liquid from the one chamber. As a rule, the pressure reducing valve is a sliding spool valve whose spool must be shifted axially in order to change the ratio of pressures between the high-pressure and low-pressure sides of the valve. When the liquid flows back from the one chamber (i.e., while the other chamber receives liquid at a maximum pressure), there develop in the reducing valve certain pressures which tend to move the spool to closing position to thus prevent further inflow and outflow of liquid from the double-acting cylinder. Such pressures (called damping or static pressures) act against one end surface of the spool and tend to stress the spring which urges the spool toward open position. The danger of undesirable blocking of return flow of liquid from the one chamber of the double-acting cylinder is especially pronounced when the differential between the high-pressure and low-pressure sides of the pressure reducing valve is rather small. As a rule, the blocking is prevented by providing the housing of the pressure reducing valve with at least one bypass which is controlled by a check valve and permits the flow of liquid from the low-pressure side to the high-pressure side when the normal path for the flow of liquid from the one chamber of the double-acting cylinder is blocked. A drawback of such proposal is that the pressure reducing valve must be provided with additional bores and check valves. This is particularly undesirable if the pressure reducing valve is formed as a flat platelike body which is installed directly between a pressure source and the double-acting cylinder or a like motor. Moreover, each check valve must be properly adjusted to insure that it opens in response to a predetermined liquid pressure.

SUMMARY OF THE INVENTION

An object of our invention is to provide a novel and improved apparatus which can regulate the flow of a hydraulic fluid to and from the chambers of double-acting cylinders or other types of fluid-operated motors or machines and wherein the likelihood of unintentional blockage of fluid flow is less pronounced than in presently known apparatus.

Another object of the invention is to provide an apparatus which can be readily adjusted to deliver to a consuming machine or motor pressurized hydraulic fluid at a desired pressure and which can operate properly without check valves or like auxiliary devices.

A further object of the invention is to provide an apparatus which can be readily combined with presently known double-acting cylinders or like fluid-operated means to control the delivery and evacuation of a hydraulic fluid medium.

Still another object of the invention is to provide a novel pressure reducing valve which can be utilized in the just outlined apparatus.

An ancillary object of the invention is to provide a novel housing and a novel valve member for a pressure reducing valve.

The apparatus of my invention serves to regulate the flow of a liquid to and from a consuming machine and comprises a pump or an analogous source of pressurized liquid, a pressure reducing valve having a housing, a valve member movable in the housing between a plurality of positions, a first channel provided in the housing to permit substantially unobstructed flow of liquid to and from one chamber of a consuming machine, a second chamber which is provided in the housing and wherein the flow of liquid to and from another chamber of the consuming machine is throttled by the valve member as a function of the position of the valve member with reference to the housing, biasing means provided in or on the housing for urging the valve member in a direction to reduce its throttling action, a surface provided on the valve member and so positioned that a pressure applied thereagainst causes the valve member to move in the direction of action of the biasing means, a chamber provided in the housing in communication with the first channel and accommodating the surface of the valve member so that the valve member is biased toward open position not only by the biasing means but also by pressurized liquid which can enter the chamber in response to admission into the first channel, and a control valve whose valve member is movable between several positions including first and second positions in which it respectively connects the source of pressurized liquid with the first and second passages.

The just described apparatus effectively prevents the valve member from blocking the flow of liquid through the second channel when the latter is disconnected from the source because the first channel then receives pressurized liquid and such liquid assists the biasing means to move the valve member toward fully open position (i.e., in a direction to reduce the throttling action in the second channel) and to maintain the valve member in such position.

The novel features which are considered as characteristic of the invention are set forth in particular in the appended claims. The improved regulating apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a somewhat schematic partly sectional view of a regulating apparatus which embodies the invention, the valve member of the control valve being shown in a position in which both outlets of the pressure reducing valve discharge pressurized liquid;

FIG. 2 is a similar schematic partly sectional view but showing the valve member of the control valve in a different position; and FIG. 3 is a similar schematic partly sectional view but showing the valve member of the control valve in still another position, there being further shown a double-acting cylinder which receives pressurized liquid from the pressure reducing valve.

DESCRIPTION OF THE PREFERRED EMBODIMENTS

Referring to the drawing in detail, the regulating apparatus includes a pressure reducing valve which comprises a valve housing or body 1 accommodating a reciprocable valve member or spool 2. The housing 1 is a flat panel and defines a first internal compartment 3 which communicates with a supply conduit 41 by way of a bore 4. The conduit 41 is further connected to a four-way control valve W whose valve member is movable to three positions indicated as $a$, $b$ and $c$. A second compartment 5 of the housing 1 communicates with a bore 6. The compartment 3 constitutes the high-pressure compartment and the compartment 5 constitutes the low-pressure compartment of the pressure reducing valve. The bore 6 is connected with a connecting line B which is further connected to the hydraulic consuming machine 100 shown in FIG. 3.

The spool 2 is provided with a circumferential groove 8 surrounded by a bore 7 of he the housing 1. Thus, the surface surrounding the bore 7 defines with the bottom surface in the groove 8 an annular compartment 9 which establishes communication between the compartments 3, 5. The annular edge 11 of the housing 1 at one axial end of the bore 7 cooperates with the annular edge 12 of the spool 2 to define therewith an annular gap 13. The edge 11 is located between the compartment 5 and bore 7. The spool 2 is formed with radial bores 14 in that portion thereof which is received in the low-pressure compartment 5, and such radial bores 14 communicate with an axial bore 15 of the spool. The bore 15 communicates with a chamber 16 at the inner axial end of the spool 2 so that the pressure in the chamber 16 equals that in the low pressure compartment 5. Thus, the front end surface 17 of the spool 2 is subjected to a pressure which equals that in the compartment 5. Such pressure against the front end surface 17 opposes the bias of a helical spring 19 which is accommodated in a chamber 18 of the housing 1 and tends to move the spool 2 to open position. The bias of the spring 19 is adjustable by a screw 20 which meshes with the housing 1. The rightmost convolution of the spring 19 bears against a platelike retainer 21 which is received in the chamber 18 and is shiftable by the adjusting screw 20.

The width of the aforementioned gap 13 determines the pressure differential between the compartments 3 and 5. The spool 2 assumes a position of rest when the liquid pressure against its front end surface 17 (in chamber 16) balances the bias of the spring 19. Thus, the pressure differential is directly proportional to the bias of the spring 19, i.e., to selected axial position of the adjusting screw 20.

The housing 1 is further provided with a transverse passage 22 one end of which is connected with a source P of pressurized liquid. The other end of the bore 22 is connected with an inlet of the control valve W by a conduit 221. A second transverse passage 23 of the housing 1 is connected with a reservoir or tank T at one end and with an outlet of the control valve W at the other (by way of a conduit 231). A transversely extending channel 24 of the housing 1 is connected with a connecting line A at one end and with an inlet of the control valve W at the other end (by way of a conduit 241). The line A connects the channel 24 of the housing 1 with the hydraulic consuming machine 100. An axially parallel bore 27 of the housing 1 communicates with the channel 24 and with the chamber 18. Thus, the pressure in chamber 18 always equals the pressure in the channel 24. The bores 4, 6 and compartments 3, 5, 9 together form a second channel which connects the conduit 41 with the line B and wherein the flow of liquid is throttled to an extent which is a function of the position of the spool 2 with reference to the housing 1.

The operation:

FIG. 1 illustrates the valve member of the control valve W in the position *b* in which the reservoir T is sealed from the conduits 41, 241, i.e., the valve member of the valve W seals the inlet of the conduit 231. The conduits 41, 241 are connected with the source P of pressurized liquid by way of the passage 22 and conduit 221. The bore 27 admits pressurized liquid into the chamber 18 and the channel 24 (which communicates with the conduit 241 and bore 27) admits pressurized liquid to the connecting line A. Pressurized liquid in the chamber 18 assists the spring 19 by exerting a pressure against the right-hand end surface 17a of the spool 2 and thereby tends to move the spool 2 in a direction to the left. However, the liquid pressure in the chamber 16 for the left-hand end surface 17 of the spool 2 is the same as the liquid pressure in the chamber 18 because the bores 14, 15 connect the chamber 16 with the compartment 5 which communicates with the compartment 3, bore 4 and conduit 41. Thus, the spring 19 is free to hold the spool 2 in fully open position because the hydraulic pressures which act upon the end surfaces 17, 17a of the spool cancel each other. The pressure in the line A then equals the pressure in the line B. No leakage of liquid takes place because the chamber 18 is connected with the line A by way of the bore 27 and channel 24.

If the valve member of the control valve W is then moved to the position *a* of FIG. 2, the line A is in communication with the reservoir T by way of the channel 24, conduit 241, valve W, conduit 231 and passage 23. The bore 4 and compartment 3 are connected with the source P by way of the passage 21, conduit 221, valve W and conduit 41. The pressure in the compartment 5 and bore 6 decreases and the pressure in the line B also decreases to the extent determined by adjustment of the spring 19. Since the channel 24 is connected with the reservoir T, the pressure in the chamber 18 decreases (because the chamber 18 communicates with the channel 24 by way of the bore 27) so that the spring 19 is free to hold the spool 2 in partly open position. This is based on the assumption that the conduit 231 or 241 does not contain a flow restrictor and that the friction in conduits connecting the reservoir T with the channel 24 is negligible.

If the valve member of the control valve W is moved to the position *c* of FIG. 3, the line A is connected with the pressure source P by way of the passage 21, conduit 221, valve W, line 241 and channel 24. The reservoir T is connected with the line B by way of the passage 23, conduit 231, valve W, conduit 41, bore 4, compartments 3, 5 and bore 6. Thus, the line B supplies liquid to the reservoir T and the source P supplies liquid to the line A. The chamber 18 is connected with the line A by way of the bore 27 so that the liquid in chamber 18 assists the spring 19 and moves the spool 2 to the fully open position corresponding to that shown in FIG. 1. The force with which the spool 2 is held in the open position of FIG. 3 is much greater than the force with which the spool is held in FIG. 1 because the bias of the spring 19 is assisted by liquid pressure against the end surface 17a in chamber 18. Thus, the spool 2 is safely held in open position while the liquid flows from the line B back to the reservoir T.

The provision of the channel 24 in the housing 1 constitutes a safety feature which is particularly important when the liquid pressure in the low pressure compartment 5 rises above a permissible value. Since the chamber 16 communicates with the compartment 5, a rise in liquid pressure in compartment 5 causes a rise of liquid pressure in chamber 16 whereby the liquid acts against the end surface 17 and displaces the spool 2 in a direction toward the chamber 18 so that the ring-shaped edge 28 of the spool enters the compartment 5 and thus permits communication between this compartment and the channel 24. Consequently, the channel 24 communicates with the line B and also with the line A as well as with the reservoir T if the valve member of the control valve W assumes the position *b* of FIG. 2.

FIG. 3 shows a hydraulic consuming apparatus, here shown as including a hydraulic double-acting cylinder 100, whose operation is regulated by the pressure reducing valve. The lines A, B are respectively connected to the left-hand and right-hand chambers of the double-acting cylinder 100. When the line A receives pressurized fluid and the line B communicates with the reservoir T (FIG. 3), the piston 101 of the cylinder 100 is moved to its right-hand end position. If the line A communicates with the reservoir T and the line B receives pressurized liquid (FIG. 2), the piston 101 is causes to move toward its left-hand end position. The piston 101 can be held in any desired (intermediate or end) position when the lines A and B communicate with the pressure source P (FIG. 1).

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended.

I claim:

1. Apparatus for regulating the flow of a liquid to and from a consuming machine, comprising a source of pressurized liquid; a pressure reducing valve having a housing, a valve member movable in said housing between a plurality of positions, said housing defining a first channel which is at least partially unobstructed in each position of said member and a second channel wherein the flow of liquid is throttled by said member as a function of the position of said member, and biasing means for urging said member in a direction to reduce its throttling action, said member having a surface so positioned that a pressure applied thereagainst causes the member to move in the direction of action of said biasing means and said housing defining a chamber which accommodates said surface and communicates with said first channel; and control valve means having a portion movable between first and second positions in which it respectively connects said source with said first and second channels.

2. Apparatus as defined in claim 1, wherein said control valve means comprises a four-way valve.

3. Apparatus as defined in claim 1, wherein said surface is an end surface of said valve member and wherein said biasing means comprises spring means accommodated in said chamber.

4. Apparatus as defined in claim 3, wherein said pressure reducing valve further comprises means for adjusting the bias of said spring means.

5. Apparatus as defined in claim 1, wherein said housing is provided with a bore connecting said chamber with said first passage.

6. Apparatus as defined in claim 1, wherein said valve member comprises a spool which is reciprocable in said housing and wherein said first channel extends transversely of said spool.

7. Apparatus as defined in claim 1, wherein said valve member has a second surface so positioned that a pressure applied thereagainst tends to move the valve member counter to the direction of action of said biasing means, said housing having a second chamber which communicates with said second channel and accommodates said second surface.

8. Apparatus as defined in claim 7, wherein said second chamber communicates with said second channel by way of at least one bore provided in said valve member.

9. Apparatus as defined in claim 1, wherein said portion of said control valve means is further movable to a third position in which both said channels communicate with said source.

10. Apparatus as defined in claim 1, wherein said housing is a flat panel and is provided with a pair of passages one of which connects said source with said control valve means and the other of which connects said control valve means with a reservoir, said portion of said control valve means connecting said other passage with said second channel in the first position thereof and with said first channel in the second position thereof and said portion of said control valve means further having a third position in which both said channels are sealed from said reservoir and communicate with said source.